United States Patent [19]

Simnacher

[11] Patent Number: 5,791,859

[45] Date of Patent: Aug. 11, 1998

[54] TIRE DEPLOYING APPARATUS

[76] Inventor: Larry W. Simnacher, 1912 Sandlewood, P.O. Box 2217, Bay City, Tex. 77404-2217

[21] Appl. No.: 821,817

[22] Filed: Mar. 21, 1997

[51] Int. Cl.$^6$ .................................................. B62D 43/04
[52] U.S. Cl. ...................... 414/463; 224/42.23; 414/466; 414/909
[58] Field of Search ...................... 224/42.21, 42.23; 414/463, 465, 466, 909

[56] References Cited

U.S. PATENT DOCUMENTS

| | | | |
|---|---|---|---|
| 1,813,094 | 7/1931 | Appel . | |
| 3,223,263 | 12/1965 | Fielding | 414/466 |
| 4,047,629 | 9/1977 | Klein | 224/42.21 X |
| 4,174,797 | 11/1979 | Yasue et al. | 224/42.21 |
| 4,613,273 | 9/1986 | Wagner | 414/463 |
| 4,884,729 | 12/1989 | Barkovskie | 224/42.21 |
| 5,022,573 | 6/1991 | Barkovskie | 224/42.21 |
| 5,238,358 | 8/1993 | Higgins et al. | 414/463 |
| 5,513,788 | 5/1996 | Cochrane et al. | 224/42.23 |

FOREIGN PATENT DOCUMENTS

| | | | |
|---|---|---|---|
| 1416531 | 9/1965 | France | B62D 43/04 |
| 1242417 | 7/1986 | U.S.S.R. | B62D 43/04 |

*Primary Examiner*—Janice L. Krizek
*Attorney, Agent, or Firm*—Harrison & Egbert

[57] ABSTRACT

An apparatus having a vehicle frame with an end, a pivot arm pivotally connected to the vehicle frame and having a tire-receiving surface thereon, and a motor connected to the pivot arm. The pivot arm is movable between a first position aligned with the vehicle frame and a second position generally transverse to the vehicle frame such that the tire-receiving surface is below and adjacent the end of the vehicle frame. The motor serves to move the pivot arm between the first and second positions. The pivot arm includes a first arm pivotally connected at one end to one side of the frame, and a second arm pivotally connected at one end to an opposite side of the frame. The tire-receiving surface is a cross-member extending between the first and second arms. An actuator is connected to the motor so as to actuate the motor so as to move the pivot arm between the first and second positions.

16 Claims, 2 Drawing Sheets

TIRE DEPLOYING APPARATUS

TECHNICAL FIELD

The present invention relates to apparatus for stowing and deploying a spare tire in a motor vehicle. More particularly, the present invention relates to a tire deploying apparatus which allows for the easy removal of the tire in the event of the need for tire replacement. More particularly, the present invention relates to a tire deploying apparatus which allows the tire to be remotely deployed from the interior of the passenger compartment for easy access by the person changing the tire.

BACKGROUND ART

In the interest of saving space within the walls and compartments of a vehicle, certain types of vehicles have typically stored the spare tire externally. This is particularly true in the case of trucks, recreational vehicles and motor homes. Large trucks generally have a sizable space beneath the frame into which a tire can be comfortably stored, and into which a user can easily reach when handling the tire. Smaller trucks and motor homes do not have this space option since their bodies are closer to the ground. Therefore, storing the tire beneath the medium-sized truck or motor home is done in a relatively small space.

When the user of a small pick-up truck, for example, wishes to utilize the spare tire which is stored under the bed of the truck, it is frequently necessary for the user to lie on the ground and unscrew a bolt securing the tire to the undercarriage of the vehicle. Some vehicles are equipped with a spare tire storage frame that is hinged to the vehicle at a forward end so that releasing the securing bolt will allow the frame to be lowered at the rear end. Nonetheless, it is necessary to get under the vehicle to remove the bolt and support the tire as it is lowered and raised, as well as to extract the tire from its under-vehicle location by hand.

Some motor homes and medium-sized trucks have a rear bumper mounted spare tire holder, where the spare tire is more accessible than if stored beneath the vehicle. However, to remove a spare tire from such a holder, the user must lift the tire which may weigh more than 60 pounds.

It is an additional problem with such a spare tire storage apparatus that such tires can be easily removed by thieves. Since the spare tire is stored on the exterior of the vehicle, the thief is able to remove the tire with proper tools. Oftentimes, it is only necessary to force open a lock and to disassemble the spare tire frame so as to obtain access to the tire. As such, it is desirable to have a storage device which is relatively theft-proof.

In the past, various patents have issued relating to devices for storing and deploying such spare tires. For example, U.S. Pat. No. 5,238,358, issued on Aug. 24, 1993 to Higgens et al. describes a vehicle spare tire storage and retrieval apparatus that utilizes a hinged ramp adapted to have its non-hinged end lowered and raised beneath the body of a vehicle by a pulley system. The ramp supports a tire carriage which is configured to hold a spare tire and to slide downwardly along the ramp when the ramp is in an angled, lowered position. At the extreme end of the downward slide, the tire carriage and the spare tire are in a position beneath and behind the vehicle chassis so as to be easily removed by the vehicle user.

U.S. Pat. No. 5,022,573, issued on Jun. 11, 1991 to R. Barkouskie teaches a tire rack which is designed for use on a pickup truck. Brackets are mounted on the frame members of the truck and are supported by a rod and arms for pivotal motion between a storage position and a release position. In the storage position, the spare tire is held horizontally against the bottom of the bed of the truck. When moved to its release position, by a rotating worm gear, the tire rack moves the spare tire below and beneath the bumper of the vehicle for easy access. A similar device is also described in U.S. Pat. No. 4,884,729, issued on Dec. 5, 1989, to the same inventor.

U.S. Pat. No. 4,613,273, issued on Sep. 23, 1986, to J. H. Wagner describes an apparatus that aids in the loading, holding and unloading of a spare tire assembly. This apparatus includes a winch, an electric motor, a coupling structure for operatively coupling the winch and motor, and an electric circuit which allows the motor and winch to be operated so as to allow the spare tire assembly to be safely secured beneath the vehicle.

U.S. Pat. No. 4,174,797, issued on Nov. 20, 1979, to S. Yasue et al. describes a spare tire holding device for maintaining the spare tire in a horizontally suspended fashion beneath the chassis of a vehicle. A winch mechanism is provided for raising and lowering the wheel holder. As such, the wheel holder is able to move between a 90° horizontal position to a 180° horizontal position.

U.S. Pat. No. 1,813,094, issued on Jul. 7, 1931 to J. J. Appel describes a tire carrier in which a tire-receiving frame is pivotally mounted to the end of the vehicle frame. A hook and lock assembly can be disconnected so as to allow for the pivotal and releasable movement of the tire from the bottom of the vehicle.

Soviet Patent No. 1,242,417 describes a spare tire mounting system which has a moving bracket. A drum receives a cable which is connected to the spare tire-receiving frame. The drum is rotatable so as to allow for a lowering of the spare tire-receiving frame.

French Patent No. 1,416,531 published in 1965, teaches a spare tire holding device which is pivotally connected to the frame of the vehicle. A remotely actuated locking mechanism retains the spare tire against the bottom of the vehicle frame.

It is an object of the present invention to provide a spare tire deploying apparatus which allows the spare tire to be conveniently stored within and deployed from the frame of the vehicle.

It is a further object of the present invention to provide a spare tire deploying apparatus which is generally theft-proof.

It is a further object of the present invention to provide a spare tire deploying apparatus which deploys the spare tire in a convenient location for access and use.

It is another object of the present invention to provide a spare tire deploying apparatus which is easy to manufacture, easy to use, and relatively inexpensive.

These and other objects and advantages of the present invention will become apparent from a reading of the attached specification and appended claims.

SUMMARY OF THE INVENTION

The present invention is a tire deploying apparatus that comprises a vehicle frame having a front end and a rear end, a pivot arm pivotally connected to the vehicle frame, and a motor which is connected to the pivot arm. The pivot arm has a tire-receiving surface thereon. The pivot arm is movable between a first position aligned with the vehicle frame and a second position generally transverse to the vehicle frame such that the tire-receiving surface is below and adjacent the end of the vehicle frame. The motor serves to move the pivot arm between the first and second positions.

In the present invention, the pivot arm includes a first arm which is pivotally connected at one end to one side of the frame, and a second arm which is pivotally connected at one end to an opposite side of the frame. The tire-receiving surface is a cross-member extending between the first and second arms. A belt is connected to the cross-member so as to removably affix the tire onto the cross-member.

The motor has a line extending to the pivot arm. The motor serves to extend the line so as to move the pivot arm from the first position to the second position. The motor serves to retract the line so as to move the pivot arm from the second position to the first position. In particular, the motor includes a reel member drivingly connected to the motor such that the reel is selectively rotatable in opposite directions. This reel serves to receive the line therein.

In the present invention, the cross-member is forward of the point of pivotal connection of the first and second arms with the vehicle when the pivot arm is in the first position. The cross-member lies below the point of pivotal connection in the second position. The tire is affixed to the cross-member. The first and second arms are spaced from each other by a distance greater than a diameter of the tire. The tire resides in a generally horizontal orientation when the pivot arm is in the first position. The tire has a portion which extends outwardly beyond the end of the vehicle frame when the pivot arm is in the second position.

In the present invention, an actuator is connected to the motor. This actuator serves to actuate the motor so as to move the pivot arm between the first and second positions. The actuator is maintained within a passenger compartment supported by the vehicle frame.

DETAILED DESCRIPTION OF THE INVENTION

Figure 1:
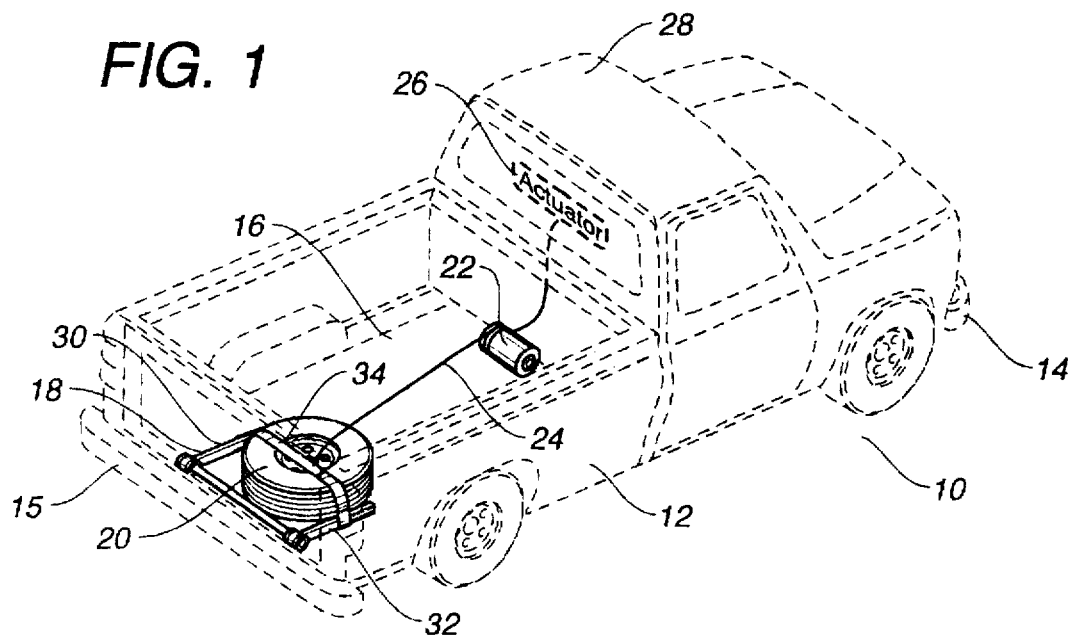
FIG. 1 shows the tire deploying apparatus of the present invention as used in a small pickup truck.

Referring to FIG. 1, there is shown at 10 the tire deploying apparatus in accordance with the teachings of the present invention. In particular, the tire deploying apparatus of the present invention includes a vehicle 12 having a front end 14 and a rear end 15. As shown in FIG. 1, the vehicle 12 is a pickup truck having a bed 16. A pivot arm 18 is pivotally connected to the vehicle frame. As will be described hereinafter, the pivot arm has a surface thereon for receiving a tire 20. A motor 22 is connected to the pivot arm 18 so as to move the pivot arm 18 between a first position (shown in FIG. 1) and a second position which lies below and toward the end 15 of the vehicle 12.

As can be seen in FIG. 1, the tire 12 is mounted onto the pivot arm 18 such that the top surface of the tire 20 will reside against a bottom surface of the bed 16 of the vehicle 12. The motor includes a line 24 which can be deployed and retracted so as to move the pivot arm 18 between a first position (as shown in FIG. 1) and the second position. The motor is actuated by a remote actuator 26 located within a cab 28 of the vehicle 12. Actuator 26 is a switch which sends an electrical signal for the actuation of the motor 22. For example, when it is desired to deploy the tire 12, the actuator 26 can be moved to one position such that the motor 22 deploys the line 24 so that the pivot arm 18 moves from the first position to the second position. After the tire 20 has been removed from the pivot arm 18, the pivot arm 18 can be retracted by moving the actuator 26 to a different position. As such, the person on the interior of the cab 28 of the vehicle 12 can control the deploying of the tire 20. Unless access to the actuator 26 is obtained, it is not possible for thieves to remove the tire 20 from the pivot arm 18. The motor 22 should have a sufficient strength so as to retain the tire 20 in its proper position against the undersurface of the bed 16.

As shown in FIG. 1, the pivot arm 18 has a first arm 30 and a second arm 32. The first arm 30 is pivotally connected at one end to one side of the vehicle frame. The second arm 32 is pivotally connected at one end to an opposite side of the vehicle frame. A cross-member (not shown) serves as the tire-receiving surface. A belt 34 is secured to the pivot arm 30 and 32 so as to retain the tire 20 in its proper position onto the cross-member. In the configuration of the present invention, it is not important that the tire 20 retain its horizontal alignment when the tire 20 is deployed. When the pivot arm 18 moves from its first position (shown in FIG. 1) to a position in which the pivot arm 18 is below the rear end 15 of the vehicle 12, the tire 20 is free to tilt in one direction or another. The simple movement of the pivot arm 18 causes the tire 20 to move to a position where it is easily accessible beneath the rear end 15 of the vehicle 12. When the pivot arm 18 is in its first position, the spare tire 20 retains its horizontal orientation by virtue of its surface-to-surface contact with the underside of the bed 16 of the vehicle 12.

Figure 2:
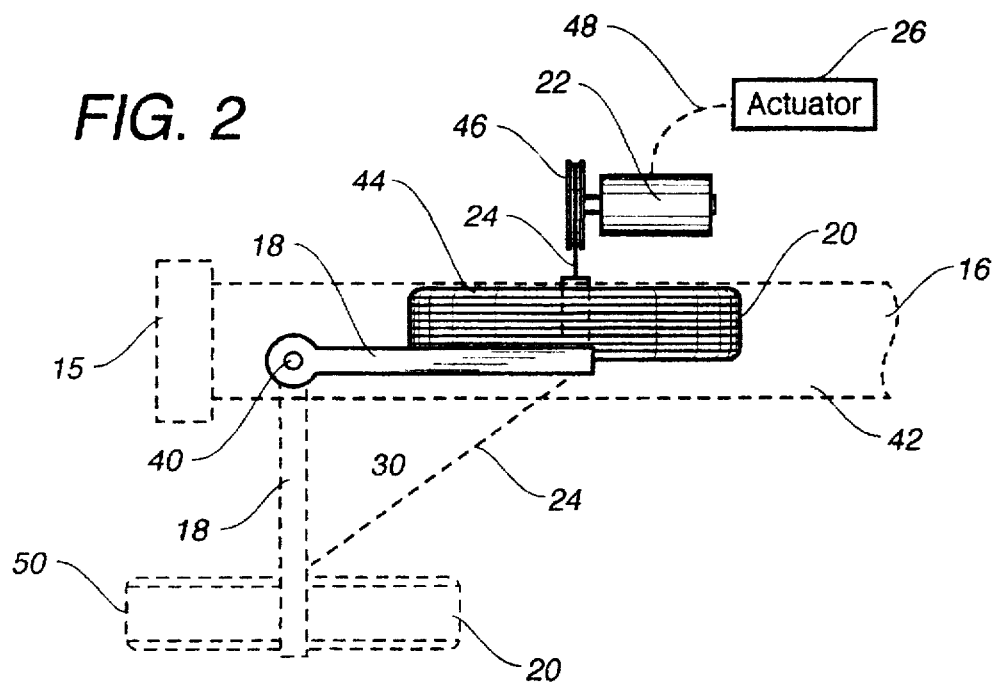
FIG. 2 is a side view showing the configuration of the present invention within the frame of a vehicle.

FIG. 2 shows the arrangement and operation of the pivot arm 18 of the present invention. Initially, it can be seen that the pivot arm 18 is pivotally connected at 40 to the frame member 42 of the vehicle 12. The tire 20 is supported on a cross-member extending between the arm 30 and the arm 32. It can be seen that the top surface 44 of the tire 20 is in generally surface-to-surface contact with an underside of the bed 16 of the vehicle 12. Importantly, a line 24 serves to connect the tire 20 and the pivot arm 18 to a motor 22. The motor 22 has an outwardly extending reel 46. The motor 22 serves to rotate the reel 46 in one direction or the other. As shown in FIG. 2, in solid lines, the tire 20 is in its uppermost position. As such, the motor 22 serves to lock the reel 46 in this position so that the tire is retained in this position. The actuator 26 is connected by line 48 to the motor 22 so as to allow for the remote actuation of the motor for the purpose of rotating the reel 46 in one direction or the other.

When it is desired to deploy the tire 20, the actuator 26 is actuated so that the motor 22 will serve to rotate the reel 46 in a direction so that the line 24 (illustrated in broken line fashion) causes the pivot arm 18 to move to a second position. As can be seen, the second position of the pivot arm 18 is generally transverse to the frame 42 and has a generally vertical orientation. In this position, the tire 20 will have an edge 50 which is below the rear end 15 of the vehicle 12 and extends slightly outwardly of this rear end 15. In this position, the tire 20 is in a position for easy access and removal.

After the spare tire 20 has been removed from the pivot arm 18, the actuator 26 will cause the motor 22 to rotate the reel 46 in an opposite direction so that the pivot arm 18 is moved to its uppermost first position. A damaged tire can be placed on the cross-member of the pivot arm 18 and stored in the position of the original tire 20.

By locating the pivot point 40 of the pivot arm 18 adjacent to the rear end 15 of the frame 42, the pivot arm 18 is in a proper position for stowage and for deployment. The present invention eliminates many of the sliding deployment mechanisms found in prior art systems. Also, the retention of the tire 20 in its uppermost position by the use of the motor 22 serves to prevent access to the tire 20 and to prevent theft of the tire 20 by those that have no access to the actuator 26. Complicated worm-gear or screw-type mechanisms are avoided through the tire deploying apparatus 10 of the present invention.

Figure 3:
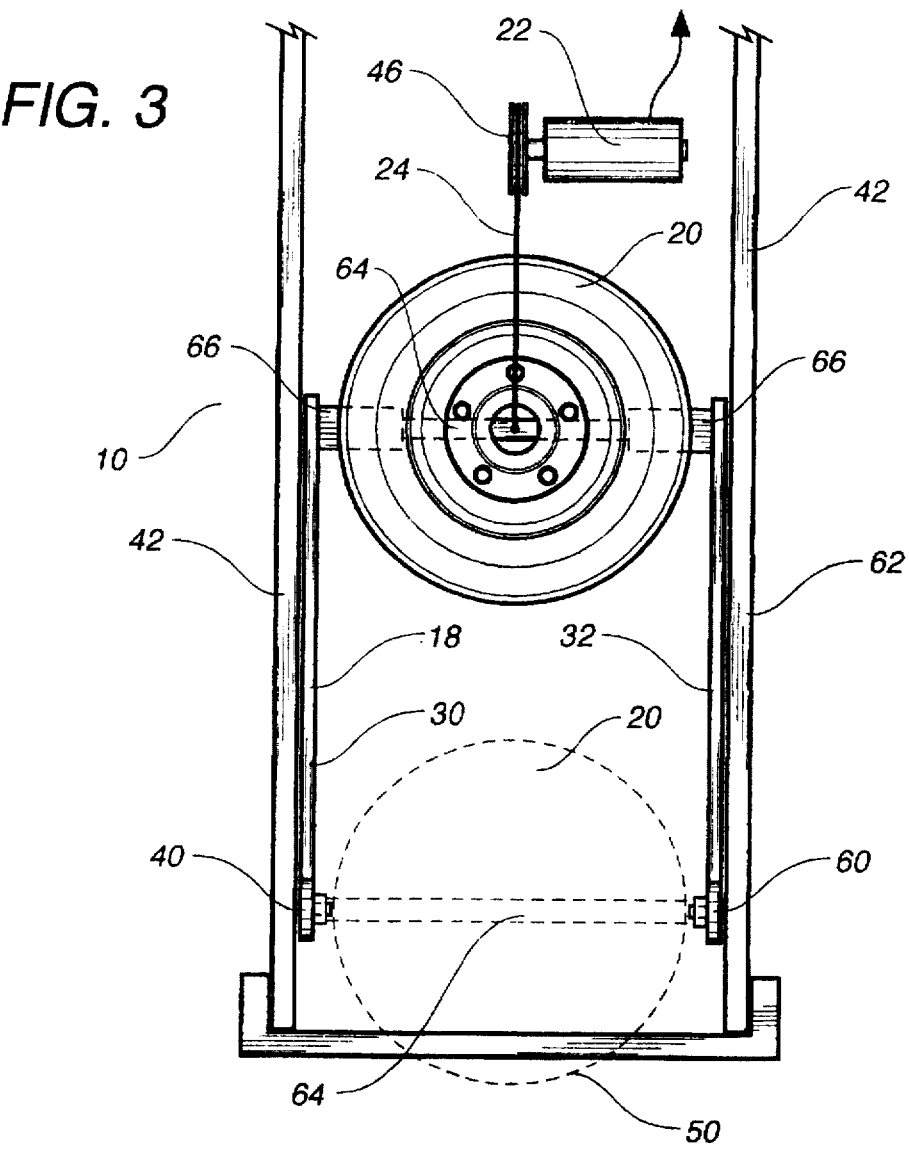
FIG. 3 is a plan view showing the configuration of the present invention as affixed to the frame of the vehicle.

FIG. 3 further illustrates the configuration of the tire deploying apparatus 10 of the present invention. As can be seen in FIG. 3, the first arm 30 is pivotally connected to the frame member 42. The second arm 32 is pivotally connected at 60 to the frame member 62 on the opposite side of the vehicle from the frame member 42. Generally, the pivot point 40 of the first arm 30 is aligned with the pivot point 60 of the second arm 32. A cross-member 64 extends between an end of the first arm 30 and an end of the second arm 32. The cross-member 64 is a tire-receiving surface upon which the tire 20 can be appropriately placed. A suitable belt or bracket member 66 can be connected to the cross-member 64 so as to properly secure the tire 20 in its proper position on the top surface of the cross-member 64. The line 24 is connected to the cross-member 64 or it can be connected to a structural member of the tire 20.

In FIG. 3, it can be seen that the line 24 extends to the reel 46 of motor 22. When it is desired to deploy the tire 20, the motor 22 is suitably actuated so that the reel 46 dispenses the line 24 so that the tire 20 is moved to its second position generally adjacent and below the end 15 of the vehicle 12. The tire 20, in this lowered position, is illustrated in broken-line fashion in FIG. 3. It can be seen that an outer edge 50 of the tire 20 will extend slightly outwardly of the rear end of the vehicle. In this position, the tire 20 is suitably retained for deployment.

In the present invention, it is desirable that the tire 20 be residing in an area between the frame members 42 and 62. However, it is possible, within the concept of the present invention that the tire 20 can be positioned within the sides of the vehicle body 12. With the proper configuration of the pivot arms 30 and 32, the tire 20 can be suitably retained between the sides of the vehicle 20 without actually being within the area of the frame of the vehicle. However, for maximum protection and safety, the tire 20 should be retained in the area of the frame. Furthermore, the arms 30 and 32 should be separated by a distance which is slightly greater than the diameter of the tire 20. This allows the tire 20 to be properly fitted between the arms 30 and 32 onto the cross-member 64.

The motor 22 of the present invention should have a proper braking mechanism so that, when in its inactive state, the tire 20 is retained in its uppermost position. This braking mechanism can be accomplished by the suitable gearing of the reel 46 in conjunction with the motor 22.

Although the present invention describes the actuator 26 as located within the passenger compartment 28 of the vehicle 12, it is possible that the actuator can be located at other positions. If desired, the actuator can have a remote control type of connection to the motor 22 so that the actuator can be stored in a glove box, a tool box, or in other position within the vehicle 12.

In the preferred embodiment of the present invention, the motor is located adjacent to the pivot arm so as to control the movement of the pivot arm. However, within the concept and claims of the present invention, the motor could be located in a more remote location on the vehicle. If the motor is positioned at a location away from the pivot arm, then a pulley or series of pulleys could be employed for the proper actuation and operation of the pivot arm.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A tire deploying apparatus comprising:

a vehicle frame having an end;

a pivot arm pivotally connected to said vehicle frame, said pivot arm having a tire-receiving surface thereon, said pivot arm movable between a first position aligned with said vehicle frame and a second position generally transverse to said vehicle frame such that said tire-receiving surface is below and adjacent said end of said vehicle frame, said pivot arm comprising:

a first arm pivotally connected at one end to one side of said frame; and a second arm pivotally connected at one end to an opposite side of said frame, said tire-receiving surface being a cross-member extending between said first and second arms; and a motor means connected to said pivot arm, said motor means for moving said pivot arm between said first and second positions.

2. The apparatus of claim 1, said pivot arm comprising:

a belt means connected to said cross-member, said belt means for removably affixing a tire onto said cross-member.

3. The apparatus of claim 1, said motor means having a line extending to said pivot arm, said motor means for extending said line so as to move said pivot arm from said first position to said second position, said motor means for retracting said line so as to move said pivot arm from said second position to said first position.

4. The apparatus of claim 3, said motor means further comprising:

a reel member; and a motor drivingly connected to said reel member such that said reel member is selectively rotatable in opposite directions, said reel member receiving said line therein.

5. The apparatus of claim 1, said cross-member being forward of the point of pivotal connection of said first and second arms with said vehicle frame when said pivot arm is in said first position, said cross-member being below the point of pivotal connection in said second position.

6. The apparatus of claim 1, further comprising:

a tire affixed to said cross-member, said first and second arms being spaced from each other by a distance greater than a diameter of said tire.

7. The apparatus of claim 6, said tire having a generally horizontal orientation when said pivot arm is in said first position.

8. The apparatus of claim 7, said tire having a portion extending outwardly beyond said end of said vehicle frame when said pivot arm is in said second position.

9. The apparatus of claim 1, further comprising:

an actuator means being connected to said motor means, said actuator means for actuating said motor means so as to move said pivot arm between said first and second positions.

10. The apparatus of claim 9, further comprising:

a passenger compartment supported by said vehicle frame, said actuator means being positioned within said passenger compartment.

11. The apparatus of claim 1, said vehicle frame positioned below a bed of a truck, said tire having a surface in contact with an underside of said bed when said pivot arm is in said first position.

12. A tire deploying apparatus comprising:

a pivot arm having a tire-receiving surface thereon, said pivot arm having means thereon for pivotally connecting said pivot arm to a vehicle frame;

a motor means connected to said pivot arm, said motor means for moving said pivot arm between a first position and a second position, said motor means having a line extending to said pivot arm, said motor means for extending said line so as to move said divot arm from said first position to said second position, said motor means for retracting said line so as to move said pivot arm from said second position to said first position, said motor means comprising:
  a reel member; and
  a motor drivingly connected to said reel member such that said reel member is selectively rotatable in opposite directions, said reel member receiving said line therein; and an actuator means being remotely connected to said motor means, said actuator means for selectively actuating said motor so as to move said pivot arm between said first position and said second position.

13. The apparatus of claim 12, said pivot arm comprising:

a first arm; and a second arm in parallel relationship to said first arm, said tire-receiving surface being a cross-member extending between said first and second arms, said cross-member being affixed to an end of said first and second arms opposite said means for pivotally connecting.

14. The apparatus of claim 13, further comprising:

a tire affixed to said cross-member, said first and second arms being separated by a distance greater than a diameter of said tire.

15. The apparatus of claim 14, further comprising:

a belt means connected to said cross-member, said belt means for removably affixing said tire onto said cross-member.

16. An apparatus comprising:

a vehicle having a frame with a front end and a rear end, said vehicle having a passenger compartment;

a pivot arm pivotally connected to said frame, said pivot arm having a tire-receiving surface thereon, said pivot arm movable between a tire-stowing position and a tire-deploying position, a point of pivotal connection of said pivot arm to said frame being generally adjacent said rear end of said frame, said tire-stowing position being on an opposite side of said point of pivotal connection from said rear end, said tire-deploying position being below said point of pivotal connection;

a motor means connected to said pivot arm, said motor means for moving said pivot arm between said first and second positions; and an actuator means connected to said motor means, said actuator means for actuating said motor means so as to move said pivot arm between said tire-stowing position and said tire-deploying position, said actuator means positioned in said passenger compartment.

* * * * *